United States Patent [19]

Benjamin

[11] Patent Number: 5,366,208
[45] Date of Patent: Nov. 22, 1994

[54] CUTTING BOARD RECEPTACLE TRAY

[76] Inventor: William Benjamin, 10408 Stonebank St., Bellflower, Calif. 90706

[21] Appl. No.: 79,149

[22] Filed: Jun. 17, 1993

[51] Int. Cl.⁵ ............................................. B23Q 3/00
[52] U.S. Cl. ...................................... 269/13; 269/15; 269/289 R; 269/302.1
[58] Field of Search .................. 99/444, 446, 425; 452/194–196, 185; 269/289 R, 302.1, 13, 15; D7/698, 398

[56] References Cited

U.S. PATENT DOCUMENTS

| | | | |
|---|---|---|---|
| 2,328,978 | 9/1943 | Hennessy | 99/425 |
| 2,639,659 | 5/1953 | Fry | 99/446 |
| 3,654,979 | 4/1972 | Montgomery | 269/289 |
| 3,972,318 | 8/1976 | Jacques | 99/446 |
| 4,653,737 | 3/1987 | Haskins et al. | 269/15 |
| 4,765,603 | 8/1988 | Huppert | 269/302.1 |

FOREIGN PATENT DOCUMENTS 2216399 10/1989 United Kingdom ............ 264/289 R

*Primary Examiner*—Robert C. Watson
*Attorney, Agent, or Firm*—Price Gess & Ubell

[57] ABSTRACT

A cutting board system provides both a cutting board and a drip pan tray for receiving juices and trimmings which are cut from food articles. The cutting board mounts directly within a drip pan tray and is provided with at least one notch whereby juices may flow into the tray below. The tray is provided with a pour system to provide convenient cutting, serving and pouring of the food to be served.

11 Claims, 1 Drawing Sheet

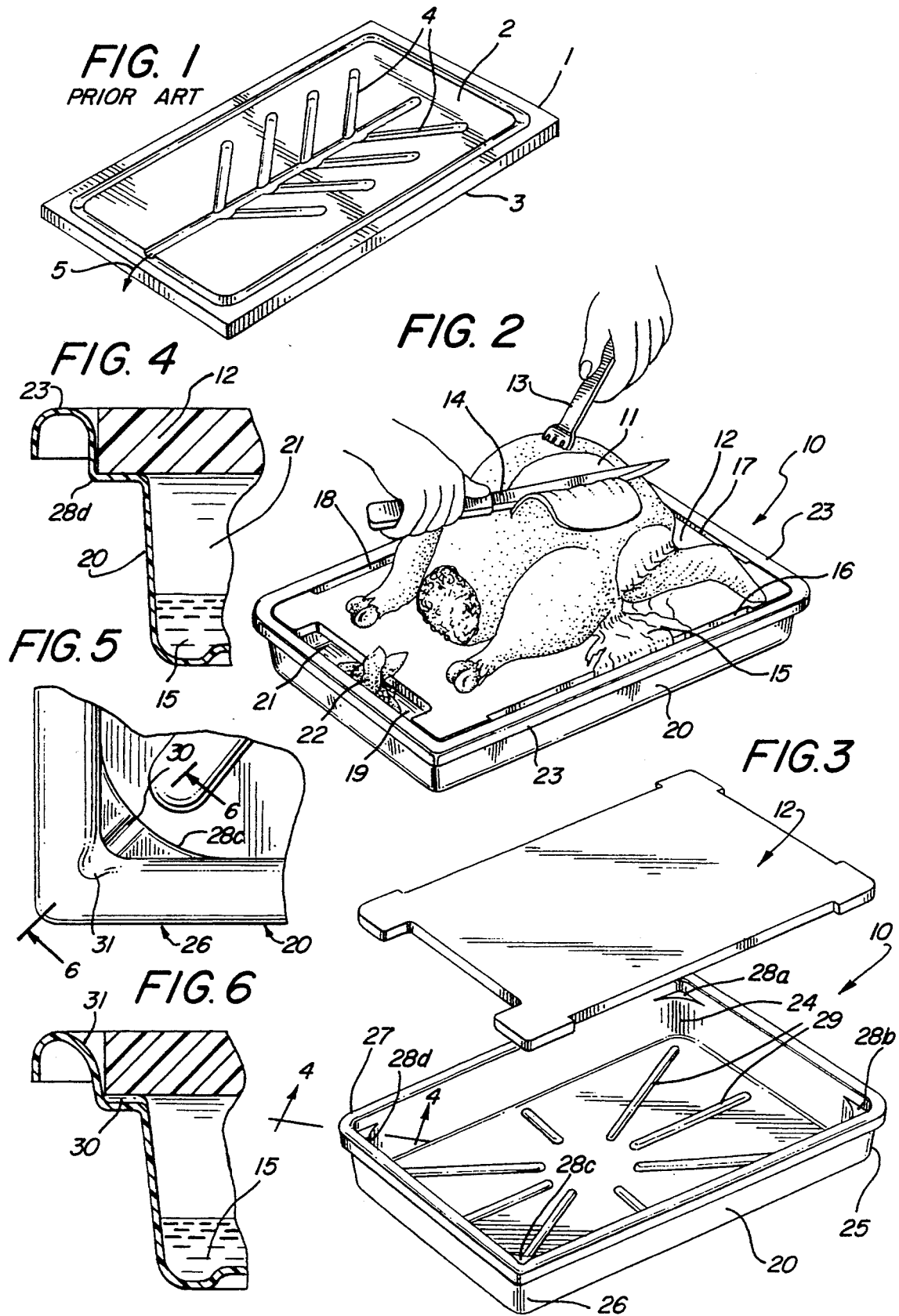

CUTTING BOARD RECEPTACLE TRAY

BACKGROUND OF THE INVENTION

1. Field of the Invention

The present invention relates to food preparation serving devices and more particularly, to a portable cutting board receptacle tray system wherein the cutting board platform is mountable upon a drip pan tray receptacle.

2. Description of Related Art

Cutting boards are platforms for supporting food items to be cut and sliced. Cutting boards are typically constructed of a wood or synthetic material such as acrylic.

Cutting boards are normally placed upon a table top surface to provide support while cutting a food item such as turkey. Since the cutting board is placed between the table top and the food item during cutting, the cutting board protects the table top from abrasions and lacerations.

The utensils used to cut or slice the food article must slice completely through the food article and oftentimes will slice the platform upon which the item is sitting. The cutting board prevents the cutting tools from damaging the table top surface.

FIG. 1 illustrates a typical cutting board used within the prior art. The illustrated cutting board is a wood platform 1 which provides a surface 2 for supporting a food article. The bottom surface 3 of the cutting board 1 sits directly upon a tabletop (not shown) for support.

Oftentimes, the cutting board 1 shown in FIG. 1 will be used to cut succulent food articles such as cooked meats, fruit, etc., which will provide juices and drippings. The top surface 2 of the cutting board illustrated in FIG. 1, provides a drainage system for juices using tortuous paths of aqueducts 4 which allow the juices to flow away from the center of the cutting board to provide a neat and organized cutting surface. These aqueducts 4 may overflow and force the juices to flow off the cutting board as shown by arrow 5, and onto the tabletop surface (not shown).

Cutting boards as shown in FIG. 1 generally do not allow food articles to be cut directly in a dining area, but instead require that the food article be cut away from the dinning area in the food service and preparation area. This is a problem since many people enjoy having a serving presentation or a cutting ceremony to provide for a more enjoyable dining experience.

If the cutting board 1 is used during serving to the diners, the dining area may become messy with juices and drippings and uncomfortable for dining. Additionally, by providing a cutting board as illustrated in FIG. 1, much of the drippings and juices are drained away and lost. Thus, the cutting board of FIG. 1 cannot adequately be used to preserve all the juices and drippings which are tasty, edible and preferable to be used for serving.

Furthermore, since the cutting board shown in FIG. 1 becomes messy, it is not desirable to use that cutting board for serving. Prepared food products which have been cut and sliced must therefore be transferred to a special serving tray for serving. It is not appropriate to cut food articles directly within a formal serving tray since the serving tray may be damaged by the cutting tools and the tray may have walls which make cutting difficult.

SUMMARY OF THE INVENTION

It is an object of the present invention to provide a cutting board system which preserves food juices and drippings for serving.

It is a further object of the present invention to provide a cutting board system which may itself be used for directly serving food articles which have been cut.

It is yet a further object of the present invention to provide a cutting board system wherein food articles may be cut and sliced without messing-up a tabletop surface with drippings.

It is yet still a further object of the present invention to provide a cutting board system wherein food articles may be neatly and conveniently cut within a dining area.

These and other objects of the present invention are achieved by providing a combination cutting board system and drip pan tray receptacle.

In the preferred embodiment of the invention, a cutting board surface is mountable within the drip pan tray receptacle to provide a convenient platform for cutting. The tray or drip pan has support ledges which extend inwardly from the side walls of the drip pan tray to support the cutting board surface when fitted within the drip pan tray.

In place, the cutting board surface's top surface is flush with the side walls of the drip pan tray receptacle. The side edges of the cutting board surface are shaved inwardly to provide a space for grease, juices and other drippings to drip into the drip pan tray.

One edge of the cutting board surface is provided with a notch which allows a person's hand to lift the cutting board surface out of the drip pan tray receptacle. Additionally, larger portions of food material which have been cut may be slid along the cutting board surface, and through the notch, into the drip pan with a cutting utensil.

With the cutting board surface removed, the drip pan tray may be used directly as a serving tray or the entire system may be used for cutting and serving directly in the dining area.

In the preferred embodiment, the drip pan tray has four supports ledges located in each of the corners of the drip pan tray to support the bottom surface of the cutting board when placed upon the drip pan tray. Additionally, notches are cut along each of the lengths of the cutting board surface to allow juices to flow into the lower-placed drip pan tray. Since there are four notches, the juices will still run into the lower drip pan tray no matter which way the supporting table or countertop may be tilted. A major notch on one end of the drip pan tray provides a handle for removing the cutting board and allows larger pieces of cut food and drippings to be pushed into the lower tray.

The preferred embodiment of the invention further provides a pour spout in one corner of the drip pan tray. When the cutting board surface is removed, the drip pan tray may then be used to serve the juices and drippings cut from the food article which, if desired, may be poured directly over served portions of the food. The pour spout provides a convenient system for pouring the drippings and juices over the served food without messy spillage.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is an illustration of a typical prior art cutting board;

FIG. 2 is an illustration of the preferred embodiment of the present invention in use;

FIG. 3 is an exploded illustration of the preferred embodiment of the present invention with the cutting board surface removed from the drip pan tray receptacle;

FIG. 4 is a cross-sectional illustration of the support means used by the drip pan tray to support the cutting board platform;

FIG. 5 is a cut-away top-down illustration showing the pour spout used in the preferred embodiment of the invention; and FIG. 6 is a cross-sectional illustration of the pour spout shown in FIG. 5.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a combined cutting board and receptacle tray.

FIG. 2 illustrates the use of a system 10 according to the preferred embodiment of the present invention. As shown, a food article 11, such as a turkey, is placed upon the cutting board 12 to be cut or sliced. As illustrated in FIG. 2, an individual will commonly use cutting utensils 13, 14 to slice the food article 11 for serving. During cutting, juices and grease 15 will flow away from the food article.

In the prior art system, as shown in FIG. 1, the juices and grease 15 would flow off the cutting board and onto the table. However, in the preferred embodiment of the invention, the juices and grease 15 flows away from the food article 11 and into one of four notches 16, 17, 18, 19 respectively provided in the periphery of the cutting board 12.

In the preferred embodiment, the notches 16, 17, 18, 19 are placed around the periphery of the cutting board 12 to provide fluid flow access into the interior 21 of the drip pan tray 20. Since the notches 16, 17, 18, 19 are placed around the periphery of the cutting board 12, they will provide access for the juices 15 to reach the interior 21 of the drip pan tray 20 no matter which way the counter top, and therefore the cutting board system 10, is tilted.

In the preferred cutting board system 10, both the cutting board 12 and the drip pan tray 20 are generally rectangularly shaped. Thus, the cutting board 12 and the drip pan tray 20 have two lengthwise sides and two widthwise sides. This allows the cutting board 12 to be mounted on the tray 20 using both the top surface and the bottom surface to provide a cutting surface when either surface becomes worn out. Furthermore, the user does not have to configure the cutting board surface for mounting upon the drip pan tray 20 in any particular manner. The cutting board surface 12 is merely placed into the drip pan tray 20 to provide a flush cutting surface.

In the preferred embodiment of the invention, notches 16 and 18 running along the length wise portions of the cutting board 12 are symmetrical and provide thin access for juices 15 to drip into the interior 21 of the tray 20. Along the width wise edges of the cutting board 12, a first notch 17 provides a similar access for juices as discussed with the lengthwise notches 16 and 18. Additionally, a second widthwise notch 19 provides a deeper cut to allow larger food pieces to be removed from the cutting board surface 12 and into the interior 21 of the drip pan tray 20. The wider width of the notch 19 also provides a handgrip for the user to lift the cutting board 12 out of the drip pan tray 20.

Furthermore, along the edges of the tray 20, handgrips 23 allow the user to easily and conveniently carry the drip pan tray 20 for serving and transport.

FIG. 3 shows an exploded illustration of the preferred embodiment of the invention with the cutting board surface 12 removed from the drip pan tray 20. In the preferred embodiment of the invention, the drip pan tray is a vacuum-formed thermoplastic such as polyethylene or an ABS acrylic tray which may be commonly bought off the shelf. The cutting board 12 is cast polyethylene and may be purchased in large sheets from which the cutting boards 12 are cut.

Within each corner 24, 25, 26, 27, respectfully, small ledges 28a, 28b, 28c, 28d are integrally formed, glued or otherwise secured into place to support the cutting board. The ledges 28 are placed sufficiently below the top edge of the drip pan tray 20, preferably one in each corner, to allow the cutting board platform 12 to provide a flush cutting surface when in place. Ribs 29 are provided in the bottom of the drip pan tray to provide strength and a convenient manner for lifting solid food droppings from the tray.

FIG. 4 shows a cross-sectional diagram of the cutting board 12 sitting upon the support ledge 28d of the drip pan tray 20. As shown in FIG. 4, the juices 15 sits within the interior 21 of the drip pan tray 20 for storage. The top surface of the cutting board 12 is flush with the side walls 23 of the drip pan tray 20. The configuration of the side walls 23, formed into a lip, provides a convenient handgrip for the user to lift the drip pan tray for transport and/or serving.

FIG. 5 shows a top-down cut-away view of the corner 26 of the drip pan tray 20. The support ledge 28c is provided with an aqueduct 30 to provide a conduit for juices 15 to be poured out of the drip pan tray 20. The aqueduct 30 provides a path to a pour spout 31 formed within the side wall 23 of drip pan tray 20.

FIG. 6 shows a cross-sectional illustration of the pour spout 31 of the preferred embodiment of the invention taken along lines 5—5 of FIG. 5 as shown in FIG. 6. The aqueduct 30 provides a conduit for the juices 15 to be delivered to the pour spout 31 when the drip pan tray is tilted for serving the juices. The pour spout 31 and aqueduct 30 system of the preferred embodiment of the invention allow a directed pouring of food juices to eliminate mess when serving.

As can be understood from the detailed description, the preferred embodiment of the invention provides a cutting board system wherein food can be cut and served in a mess-free atmosphere anywhere including a dining area. No messy juices are allowed to escape from the system to disturb the environment. The drip pan tray provides the convenience of a basin for storing juices and large trimmings. The cutting board system is easily portable, and may be used both for cutting and serving purposes with a convenient pour spout.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A cutting board, comprising:
   a cutting board surface for supporting a food workpiece for cutting, the workpiece providing drippings when being cut, the cutting board having four corners and four notches located alternatively therebetween along a periphery of the cutting board through which the drippings may pass; and
   a drip pan tray receptacle for receiving the drippings, the drip pan tray receptacle supporting the cutting board surface in a cutting position only at the four corners, thereby providing an unobstructed path through which drippings may flow into the drip pan tray receptacle.

2. The cutting board of claim 1, wherein at least one of the four notches is sufficiently large to allow large solid pieces of the food workpiece to be slid into the drip pan tray.

3. The cutting board of claim 2, wherein at least one notch is sufficiently large to provide for the user to grip the cutting board surface and lift it from the drip pan tray.

4. The cutting board of claim 1, wherein the cutting board surface provides a flush top surface when placed within the drip pan tray receptacle.

5. The cutting board of claim 1, wherein the drip pan tray and the cutting board surface having a generally rectangular configuration.

6. The cutting board of claim 1, wherein the drip pan tray has support ledges within each of four corners to allow the cutting board surface to be mounted in the cutting position.

7. The cutting board of claim 6, wherein a corner of the drip pan tray receptacle is provided with a pour spout to serve liquid drippings.

8. The cutting board of claim 1, wherein the drip pan tray has four corners with support ledges extending inwardly from each of the four corners to allow the cutting board surface to be mounted in the cutting position.

9. A cutting board receptacle tray comprising:
   a drip pan tray receptacle including a base and four side walls defining an interior, the four side walls forming four corners;
   four support ledges located only in the four corners on the side walls in the interior of the drip pan tray receptacle;
   a cutting board including a cutting board surface for supporting a food workpiece for cutting, the cutting board having a rectangular shape with four corners and being received within the four side walls of the drip pan tray receptacle and supported by the four support ledges with the cutting board surface flush with a top edge of the side walls; and
   four notches formed in the cutting board along the sides of and between the four corners of the cutting board for allowing juices and solid pieces of the food workpiece to be conducted therethrough into the drip pan tray receptacle, the conduction being unobstructed by the four support ledges.

10. The cutting board receptacle tray of claim 1 wherein the four support ledges are an integrally formed part of the drip pan tray receptacle.

11. A cutting board receptacle tray comprising:
    a drip pan tray receptacle including a rectangular base and four side walls defining an interior;
    four support ledges located at a spaced distance below a top edge of the side walls, one each integrally formed only in a corner formed by the four side walls of the drip pan tray receptacle;
    a cutting board including a peripheral edge having four corners and a surface for supporting a food workpiece for cutting, the cutting board being received within the four side walls of the drip pan tray receptacle and supported by the four support ledges, the cutting board having a thickness such that, in conjunction with the spaced distance of the four support ledges relative to the top edge of the side walls, the cutting board surface is substantially flush with the top edge of the side walls; and
    a plurality of notches formed along edges of the cutting board between the four corners of the cutting board for allowing juices and solid pieces of the food workpiece to be conducted therethrough into the drip pan tray receptacle, the conduction of juices and solid pieces being unobstructed by the four support ledges.

* * * * *